United States Patent Office 3,195,912
Patented July 20, 1965

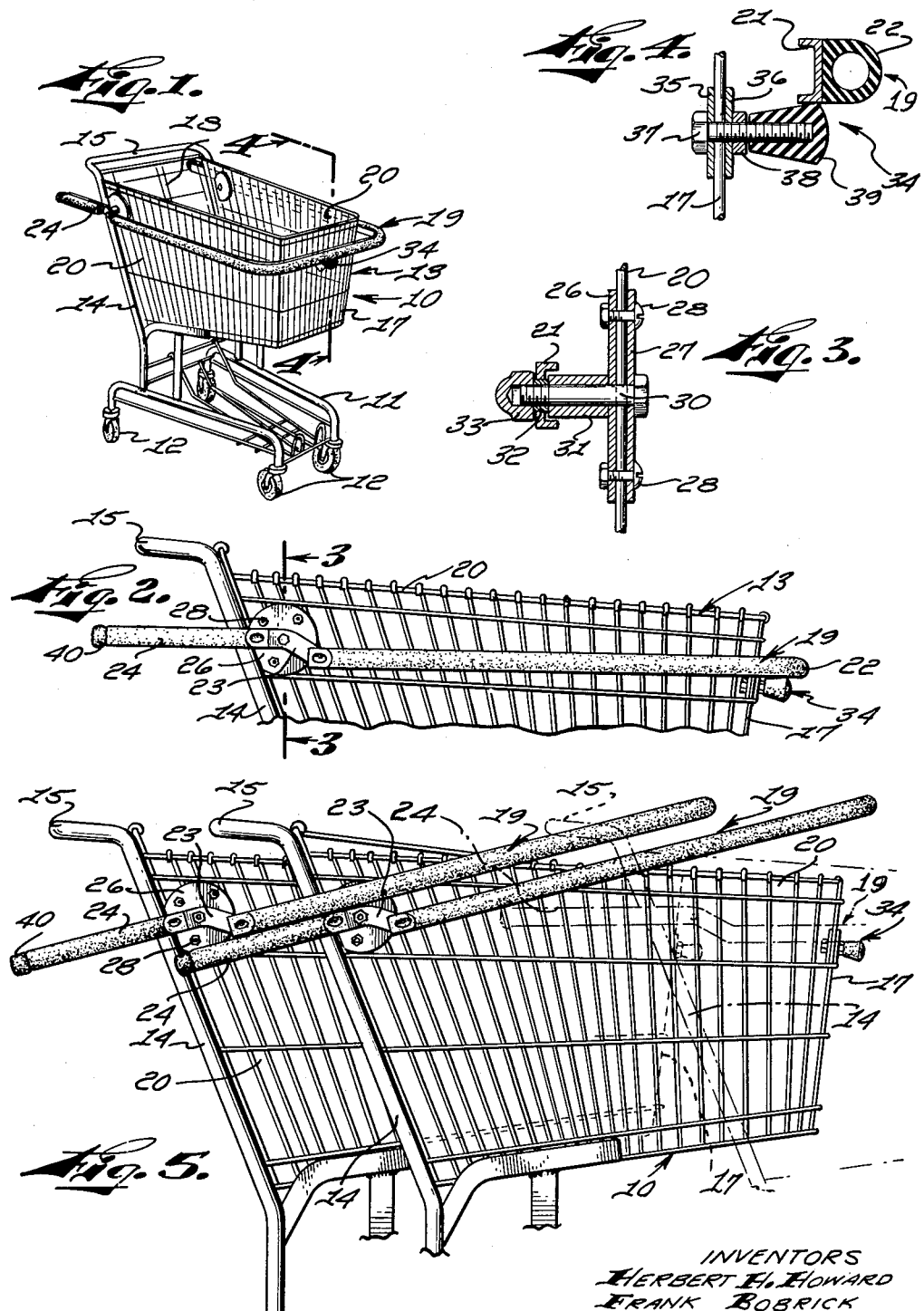

3,195,912
BUMPER FOR A NESTABLE CART
Herbert H. Howard, 20345 Ruston Road, Woodland Hills, Calif., and Frank Bobrick, 5450 Norwich, Van Nuys, Calif.
Filed June 26, 1963, Ser. No. 290,828
9 Claims. (Cl. 280—33.99)

This invention relates to a construction of shopping carts and more particularly to an arrangement for providing a bumper on such carts.

The widespread use of shopping carts in grocery stores and many other retail outlets has emphasized the need for an appropriate bumper to be fitted on the carts. For example when unloading a shopping cart to shift its contents into an automobile, the cart frequently will roll against the side of the car. Often the result is scratching or denting the car from the contact with the hard wire surface of the shopping cart. Despite the desirability of a bumper on a shopping cart, there has been no significant commercial use of any such arrangement. Basically, this is because of the inherent necessity for nesting of the shopping carts. It is essential that the carts fit one within the other as closely as possible in order that they may be handled more readily and will occupy less valuable floor space in the store. Conventional bumper designs have reduced or eliminated the ability to nest and as a result have been unacceptable for nearly all purposes.

The present invention overcomes the above-enumerated difficulties, resulting in a bumper that is entirely effective yet at the same time does not interfere with the complete nesting of the shopping carts. This is accomplished by a U-shaped member extending around the front and sides of the cart, pivoted about a transverse axis at the rear portion of the cart. An elastomeric element on the outer surface of this member serves as the protective bumper surface. Nesting of the carts is effected merely by pivoting the U-shaped members upwardly so that they are inclined to the horizontal and are in effect themselves nested along with the carts. In other words, the forward edge of each of these members is lifted above the body of the shopping cart with which it is associated, and the bumper members are positioned in a parallel relationship at a shallow angle with respect to the horizontal. Rearward extensions on the bumper members cause them to be raised automatically out of the way when a number of the shopping carts are being nested together.

Accordingly, it is an object of this invention to provide a bumper device suitable for shopping carts or similar items.

Another object of this invention is to provide a bumper that will not interfere with nesting of shopping carts.

A further object of this invention is to provide a bumper device automatically shifted out of the way when several shopping carts are being nested together.

An additional object of this invention is to provide a shopping cart bumper of effective nature, yet of relatively simple and economical construction.

These and other objects will become apparent from the following detailed description taken in connection with the accompanying drawing in which:

FIGURE 1 is a perspective view of a shopping cart having associated with it the bumper of this invention;

FIGURE 2 is an enlarged fragmentary side elevational view illustrating the bumper in the lowered position;

FIGURE 3 is an enlarged fragmentary sectional view, taken along line 3—3 of FIGURE 2, showing the connection of the bumper to the cart;

FIGURE 4 is an enlarged fragmentary sectional view, taken along line 4—4 of FIGURE 1, showing the connection to the cart of the stop element that limits the downward travel of the bumper; and FIGURE 5 is a side elevational view illustrating the manner in which the shopping carts can be nested together, with the bumpers inclined upwardly out of the way.

With reference to the drawing, there may be seen in FIGURE 1 a conventional shopping cart 10 that includes a base frame 11 supported by four caster wheels 12. A wire basket 13 is carried by the frame, while upwardly projecting members 14 at the rear of the cart are joined together by a transverse handle portion 15 that is located above and to the rear of the rear wall 18. Additionally, the frame 11 tapers to the front of the cart 10. As a result, these carts can be nested, with the basket of one shopping cart fitting inside the basket of the cart adjacent to it. Similarly, the frame 11 of one can extend into the corresponding element of the adjacent cart with which it is nested.

The bumper device of this invention includes a substantially U-shaped element 19 that is fitted around the sides 20 of the cart and the front wall 17. The member 19 includes a structural element 21 which may be an extruded metal channel as best seen in FIGURE 4, or of other suitable configuration. Attached to the outer surface of the member 21, such as by bonding, is a resilient bumper element 22. Normally this will be of elastomeric material such as rubber. Member 22 may be hollow, as shown, resulting in appropriate resiliency together with adequate size to effectively perform its function as a bumper member.

The U-shaped unit 19 includes a short offset section 23 on either side near its ends, where the resilient element 22 is not attached, beyond which is an outward extension 24. The end portions 24 project past the end wall 18 of the cart beneath the handle element 15.

The unit 19 is connected to the cart for pivotal movement about a transverse axis adjacent the end wall 18. This connection is obtained readily without drilling or otherwise altering the existing structure of the shopping cart. To this end, therefore, on either side of the cart there is bolted a pair of plates 26 and 27. By this arrangement the wire elements of the sides 20 are disposed between the plates 26 and 27 and when the bolts 28 are tightened, the plates are securely and firmly clamped in place. It is a simple matter to fit the bolts 28 between the wires of the side 20 in effecting this attachment.

The plates 26 and 27 include aligned central apertures which receive a larger bolt 30 that extends outwardly through a sleeve 31 which projects from the side of plate 26. An end section 32 of reduced diameter is formed on the sleeve 31, or alternatively a separate bushing may be provided at this location. The element 32 extends through an aperture in the structural member 21 of the bumper unit thereby pivotally mounting the bumper with respect to the shopping cart body, at the approximate location where the end sections 24 join the offsets 23. A nut 33 on the end of the bolt completes the attachment. The length of the bearing section 32 is greater than the thickness of the structural member where it passes through this element, so that the bumper unit is freely rotatable, and is positioned transversely outward of the sides 20 adjacent the open top of the cart. It can be seen therefore that in this manner the bumper unit is attached quickly to the sides of the shopping cart with a minimum of tools and without requiring any modification of the shopping cart itself.

The downward movement of the front end of the bumper unit is limited by a stop assembly 34 that projects outwardly from the central upper portion of the front wall 17 of the cart. The stop 34 is clamped to the front wall by means of plates 35 and 36 through which a bolt 37 extends. A nut 38 on the inner portion of the bolt tightens the plates 35 and 36 onto the front wall 17 of the cart. On the outer end of the shank of the bolt is fitted a resilient member 39 which is positioned beneath the bumper unit such that the structural portion 21 at the forward wall will engage the stop and the bumper will be caused to assume a horizontal attitude. It is possible to allow the front wall of the cart to serve as the means to limit downward rotation, but results are considerably more satisfactory with the inclusion of the stop assembly.

It can be seen that in this manner there is provided a relatively simple bumper unit that, nevertheless, is entirely effective to protect both the cart and objects which it may strike. The bumper is mounted to project outwardly from the wall of the shopping cart so that the resilient element 22 will contact any adjacent object and prevent engagement by the body of the cart itself. The bumper extends around the front and sides of the cart where it actually is needed, rather than at the rear where the cart will be held and manipulated through the handle 15.

Despite the fact that the bumper extends entirely around the critical areas of the shopping cart, nesting of the carts can be effected without interference from the bumpers. This is accomplished by lifting the bumpers up so that they will project above the uppermost portions of the shopping carts and will not preclude movement of the carts together. This relationship may be seen in FIGURE 5. Here it can be seen that the forward portion of the bumper of the cart to the left in the drawing engages on its bottom edge the upper surface of the rearwardly projecting extension 24 of the adjacent bumper to its right. Thus, with the carts shoved together in their nested relationship as illustrated, the bumpers 19 are raised up so that their forward edges are out of the way, permitting the carts to assume their full nested position. With the carts nested, the bumpers cannot drop down but are held in this inclined position. The extensions 24 of the right-hand cart engage the undersurface of the bumper to the left adjacent the pivot axis defined by the bolts 30. This precludes clockwise rotation of the bumper on the right-hand cart. Also, the forward portion of the bumper 19 of the left-hand cart is disposed above the fixed axis of the bolts 30 of the right-hand cart, so that it too cannot move in a downward direction. Thus, the bumpers are held properly raised and maintained in this position as long as the carts are nested together.

It can be seen by the foregoing, therefore, that we have provided a shopping cart bumper that fully and effectively protects adjacent objects from damage by the shopping cart. It is secured in place without requirement of any particular skill or more than a few tools. No modification must be made to a conventional cart. The unit is also basically of simple and economical construction. Nevertheless, it will not interfere with the nesting of the carts and will not prevent rapid handling of the carts by attendants and nesting them and maneuvering the carts.

The offset sections 23 of the bumpers are useful in obtaining a higher lift of the forward ends of the bumpers so that the bumpers will clear the handles 15 of the shopping carts. The amount of rotation of the bumper is determined by the engagement between the undersurface of one bumper inwardly of its pivot axis and the upper surface of the adjacent bumper outwardly of the axis. Hence, raising the latter surface by this offset will cause more pivotal movement to take place as the carts assume their fully nested realtionship.

The movement of the bumpers out of the way for the nesting operation takes place automatically as the carts are shoved together, and after the first two carts are nested manual manipulation is not required. This adds greatly to the facility with which the invention may be use. As the carts are brought to the nested postion, as seen for the cart shown in phantom in FIGURE 5, the rearward extensions 24 of the bumper of the approaching cart will strike the under surface of the unpwardly inclined bumper 19 of the first cart in the nested assembly. Hence, as the carts are moved together, the bumper previously inclined will pry downwardly on the extensions 24, and the bumper of the approaching cart will be rotated progressively to the fully raised position as the cart is shoved inwardly. Any number of the carts may be associated together in this manner with each bumper being raised by the bumper on the outer cart as the units are put together. It is necessary only to manually rotate the bumper of the first cart of the assembly to place its bumper in the angled relationship and accomplish this automatic pivotal movement of all succeeding carts nested together.

As an added protection, there may be included resilient plug elements 40 at the ends of the extensions 24. Hence, if a cart should roll backward, the elements 40, which are to the rear of the handle 15, will afford protection upon impact at that location.

The foregoing detailed description is to be clearly understood as given by way of illustration and example only, the spirit and scope of this invention being limited solely by the appended claims.

We claim:

1. A shopping cart bumper comprising
    a substantially U-shaped member adapted to fit around the sides and front of a shopping cart,
        said member having outwardly directed surfaces adapted to contact adjacent objects,
    and means for attaching said member to a shopping cart about a transverse axis adjacent but inwardly of the distal ends of said U-shaped member, for allowing said U-shaped member to pivot upwardly about said axis for nesting with such a member on an adjacent shopping cart.

2. A device as recited in claim 1 in which
    said U-shaped member at a location inwardly of said attaching means is offset downwardly in a direction normal to the transverse plane thereof, for thereby increasing the upward pivotal movement of said U-shaped member when the under surface of said U-shaped member is engaged by the upper surface of an adjacent one of said U-shaped members at a location adjacent said attaching means of said adjacent U-shaped member upon nesting of shopping carts associated therewith.

3. In combination with a nestable shopping cart having an open top, a duality of side walls, a front wall and a rear wall, a bumper for said cart comprising
    a substantially U-shaped member extending around said side walls and said front wall adjacent said open top,
    and means for pivotally mounting said U-shaped member on said cart about a transverse axis adjacent said rear wall,
        said U-shaped member having end portions extending outwardly of said rear wall.

4. A device as recited in claim 3, in which said pivotal mounting means includes
    a clamp gripping either of said sides of said cart,
        each clamp carrying an outwardly projecting bearing means,
        said U-shaped member engaging said bearing means outwardly of said sides.

5. A device as recited in claim 4, in which each of said U-shaped members includes
    an offset downwardly and forwardly of said bearing means,
        whereby the portion of the U-shaped member adjacent the front wall of said cart is lower than said portion projecting rearwardly from said bearing means.

6. A device as recited in claim 3 including in addition stop means for limiting the downward rotational movement of said U-shaped member.

7. A device as recited in claim 6 in which said stop means includes a resilient member for engagement with said U-shaped member, and includes clamp means for securing said resilient member to said cart.

8. A combination with a nestable shopping cart having a wire body having an open top, a duality of sides, a front wall and a rear wall, a bumper device comprising
    a substantially U-shaped member extending around said sides and said front adjacent said open top,
        said U-shaped member having an outer resilient portion
        and an inner structural portion,
    a duality of mounting units for said U-shaped member,
        said units being carried by said sides adjacent said top and said rear wall,
        each of said mounting units including a duality of plates,
            said plates being disposed on opposite surfaces of the side with which they are associated,
        means for urging said plates together whereby said plates grip said side wall,
        a laterally extending member projecting from the plate on the outer surface of said side,
        and bearing means on said outwardly projecting member,
            said structural portion of said U-shaped member engaging said bearing means adjacent and inwardly of the distal ends of said U-shaped member for rotation thereon.

9. A shopping cart bumper comprising
    a substantially U-shaped member adapted to fit around the sides and front of a shopping cart,
        said member having outwardly directed surfaces adapted to contact adjacent objects,
    and means for attaching said member to a shopping cart about a transverse axis adjacent but inwardly of the distal ends of said U-shaped member,
        said attaching means including
            clamp means adapted to engage the sides of a shopping cart,
            and bearing means laterally outward of said clamp means for providing a pivotal connection outwardly of the sides of a shopping cart.

References Cited by the Examiner

UNITED STATES PATENTS

| | | | |
|---|---|---|---|
| 863,124 | 8/07 | Welton | 293—71 |
| 1,570,410 | 1/26 | Strauss | 293—70 X |
| 2,188,082 | 1/40 | Imhofe | 293—71 |
| 3,052,319 | 9/62 | Swanson | 280—33.99 X |

FOREIGN PATENTS 1,211,039   10/59   France.

A. HARRY LEVY, *Primary Examiner.*